United States Patent [19]

Ito

[11] Patent Number: 4,952,038
[45] Date of Patent: Aug. 28, 1990

[54] ZOOM LENS SYSTEM FOR USE IN COMPACT CAMERA

[75] Inventor: Takayuki Ito, Tokyo, Japan

[73] Assignee: Asahi Kogaku Kogyo Kabushiki Kaisha, Tokyo, Japan

[21] Appl. No.: 179,456

[22] Filed: Apr. 8, 1988

[51] Int. Cl.$^5$ .............................................. G02B 15/14
[52] U.S. Cl. ..................................... 350/427; 350/450
[58] Field of Search ........................ 350/423, 427, 450

[56] References Cited

U.S. PATENT DOCUMENTS

| | | | |
|---|---|---|---|
| 4,682,860 | 7/1987 | Tanaka et al. | 350/423 |
| 4,701,033 | 10/1987 | Masumoto | 350/425 |
| 4,729,643 | 3/1988 | Kawaguchi et al. | 350/427 |
| 4,733,952 | 3/1988 | Fujioka | 350/427 X |
| 4,773,744 | 9/1988 | Yamanashi | 350/427 |

Primary Examiner—Scott J. Sugarman
Attorney, Agent, or Firm—Sughrue, Mion, Zinn, Macpeak & Seas

[57] ABSTRACT

A zoom lens system for use in a compact camera is disclosed which comprises, in order from the object side, a first lens component having a positive focal length, a second lens component having a positive focal length and a third lens component having a negative focal length, and which satisfies the following conditions (A) and (B):

(A) when zooming is made from the wide-angle end to the narrow-angle end, all of the first, second and third lens components are displaced toward the object side, with the distance between the first and second lens components being increased while the distance between the second and third lens components is decreased; and (B) the second lens component includes a diaphragm stop and is composed of a first unit that is positioned closer to the object than the diaphragm stop and which has a negative focal length, and a second unit that is positioned closer to the image than the diaphragm stop and which has a positive focal length, the first and second units being adapted to be displaced ensemble.

15 Claims, 4 Drawing Sheets

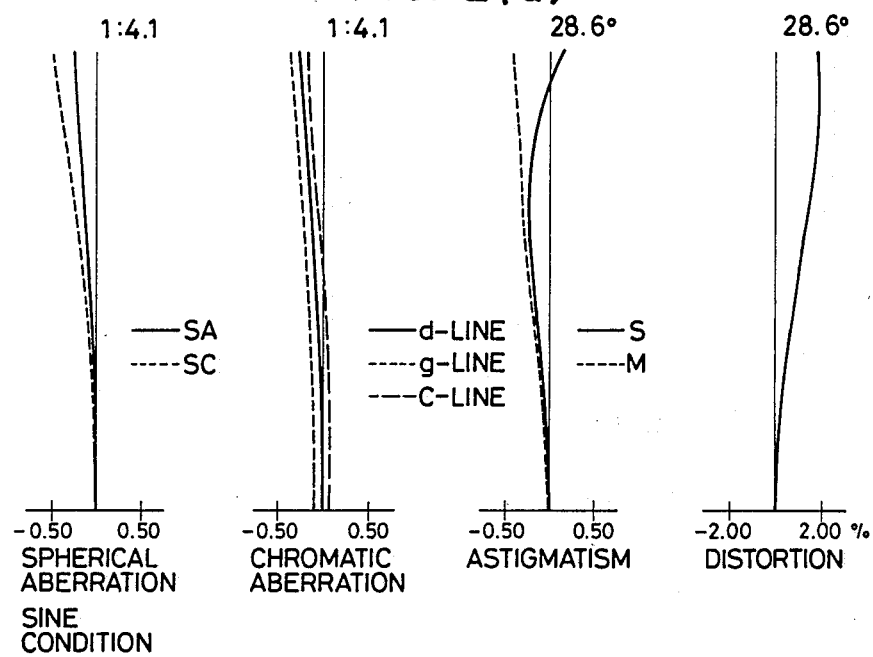
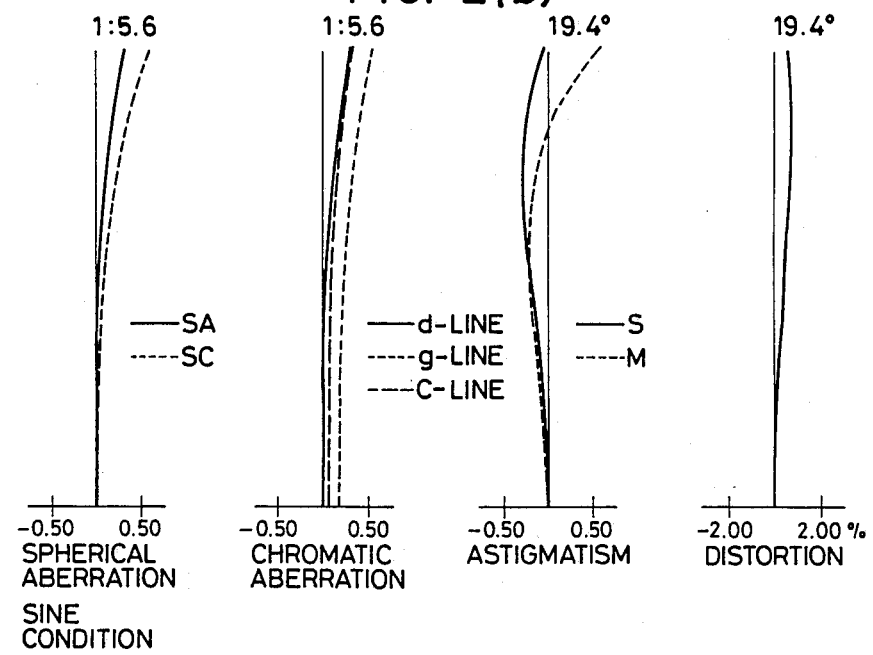

ZOOM LENS SYSTEM FOR USE IN COMPACT CAMERA

BACKGROUND OF THE INVENTION

The present invention relates to a zoom lens system adapted for use in a compact camera and which is subject to no strict condition on back focus.

The following three types of zoom lens systems are available for use in compact cameras.

(I) A telephoto two-component type composed of a first lens component having a positive focal length inclusive of a stop diaphragm and a second lens component having a negative focal length. An example of this type of lens system is disclosed in Japanese Unexamined Published Patent Application Nos. 128911/1981 and 48009/1985.

(II) A three component type which is a modification of type (I) and which is composed of a first lens component having a positive focal length inclusive of a diaphragm stop, a second lens component having a positive focal length, and a third lens component having a negative focal length. An example of this lens type is disclosed Japanese Unexamined Published Patent Application No. 184916/1983.

(III) A four-component type composed of a first lens component having a positive focal length, a second lens component having a negative focal length, a third lens component having a positive focal length, and a fourth lens component having a negative focal length. An example of this lens type is disclosed in Japanese Unexamined Published Patent Application No. 57814/1985.

These zoom lens systems, however, have the following problems:

The two-component type (I) lens system has a very simple construction but it requires a complicated camera composition since the first lens component including a diaphragm stop has to be displaced by ten-odd millimeters and the large-diameter second lens component by about 30 mm in order to achieve zooming. These large amounts of displacement also make it difficult to realize a compact camera.

The three-component type (II) lens system only differs from type (I) in that the first lens component is divided into two positive lens units, so the first lens component including a diaphragm stop has to be displaced by the same about as what is necessary in type (I) for zooming. In addition, the large-diameter third lens component has to be moved by an amount that is not much different from what is required for the second lens component of type (I). It is therefore also difficult to realize a compact camera.

The four-component type (III) lens system employs an entirely different lens composition than either of types (I) and (II) in that the second lens component including diaphragm stop is fixed. As for the other lens components, the first lens component needs to be displaced by the same amount as what is necessary in type (I) but the third and fourth lens components are displaced by smaller amounts, the amount of displacement of the large-diameter fourth lens component being only about half the amount required in type (I). However, the use of four lens components renders the lens configuration very complex. In addition, the individual lens components, in particular, the second and third components have such large powers that any slight error introduced in the manufacturing process will cause serious effects on the performance of the resulting lens system. Therefore, this type of lens system is rather difficult to manufacture.

SUMMARY OF THE INVENTION

An object, therefore, of the present invention is to provide a zoom lens system suitable for use in a compact camera. In general, the zooming method employed in this lens system is basically the same as that used in the prior art three-component type (II). But instead of dividing the first lens component in type (I) into two positive lens units, the system of the present invention is designed in such a way that the second and third lens components in the prior art four-component type (III) are to be displaced ensemble as a single component. This is effective in reducing not only the required amounts of lens displacement but also the possible deterioration of system performance due to poor engineering of individual lens components.

BRIEF DESCRIPTION OF THE DRAWINGS

FIGS. 2(A), 4(A) and 6(A) are graphs showing the aberration curves obtained at the wide-angle position of zoom lens systems according to Examples 1, 2 and 3, respectively; and FIGS. 2(B), 4(B) and 6(B) are graphs showing the aberration curves obtained at the middle-angle position of zoom lens systems according to Examples 1, 2 and 3, respectively.

DETAILED DESCRIPTION OF THE INVENTION

Figure 1:
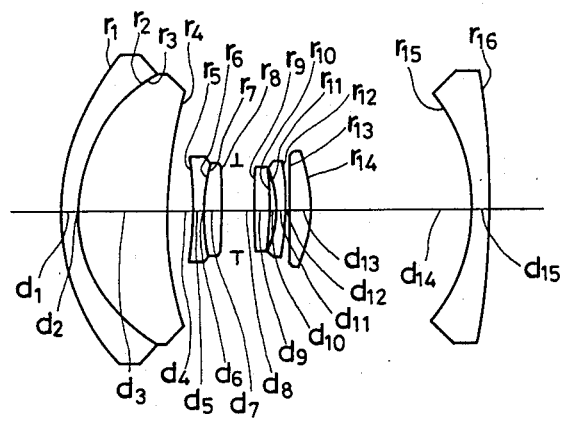
FIGS. 1, 3 and 5 are simplified cross-sectional views of zoom lens systems at the wide-angle end constructed according to Examples 1, 2 and 3, respectively.
Figure 3:
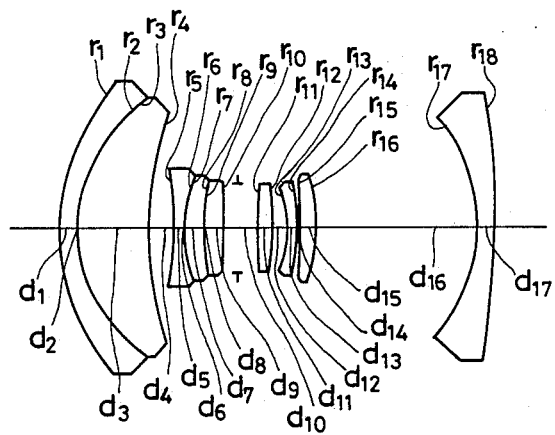
Figure 5:
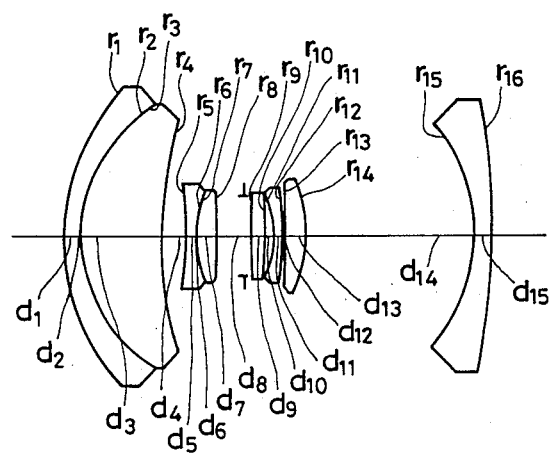
Figure 4A:
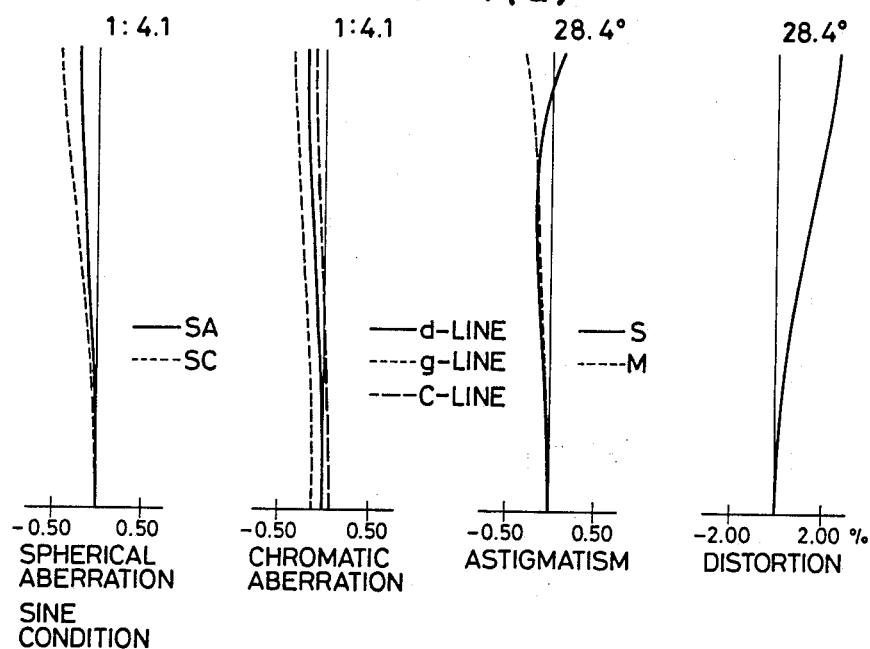
Figure 4B:
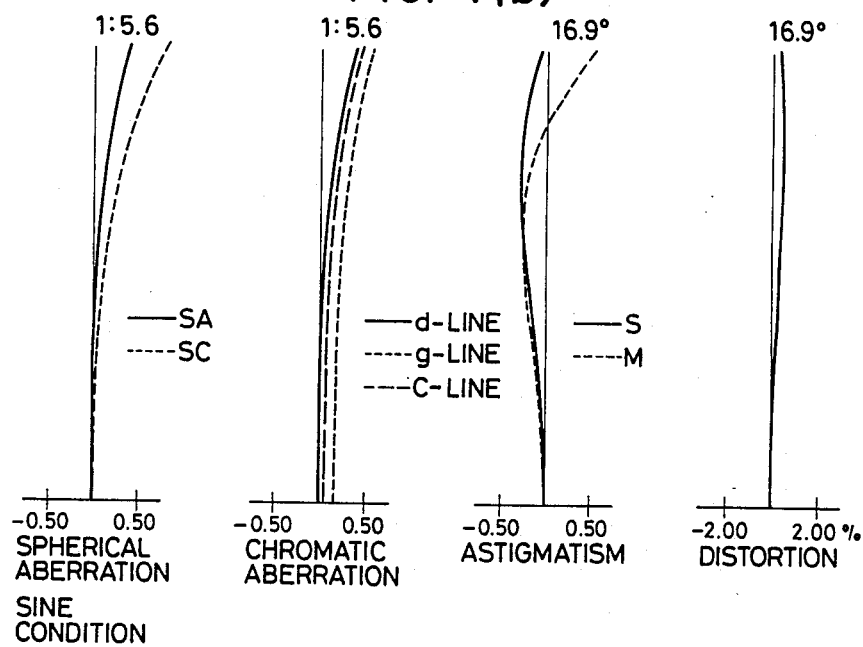
Figure 6A:
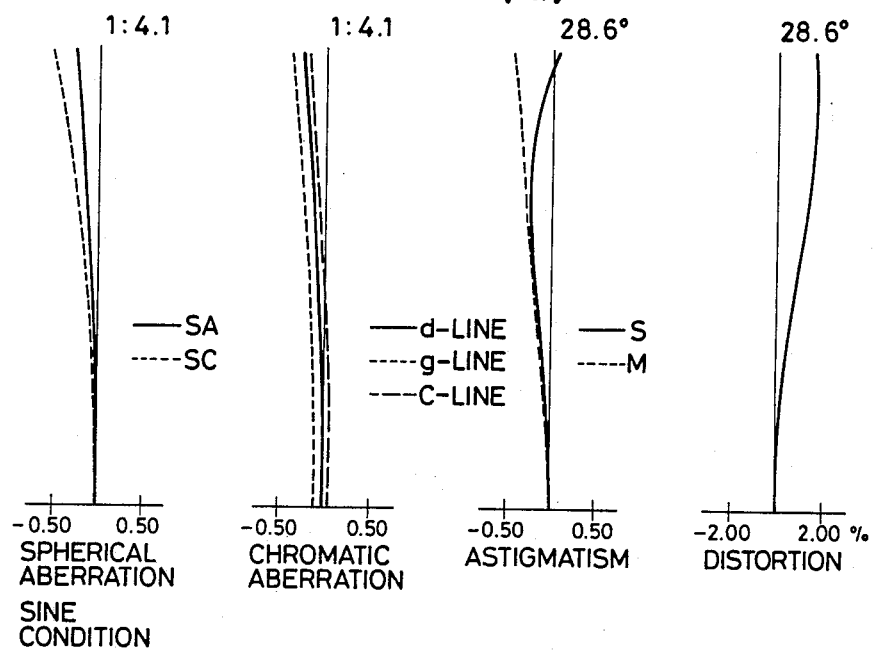
Figure 6B:
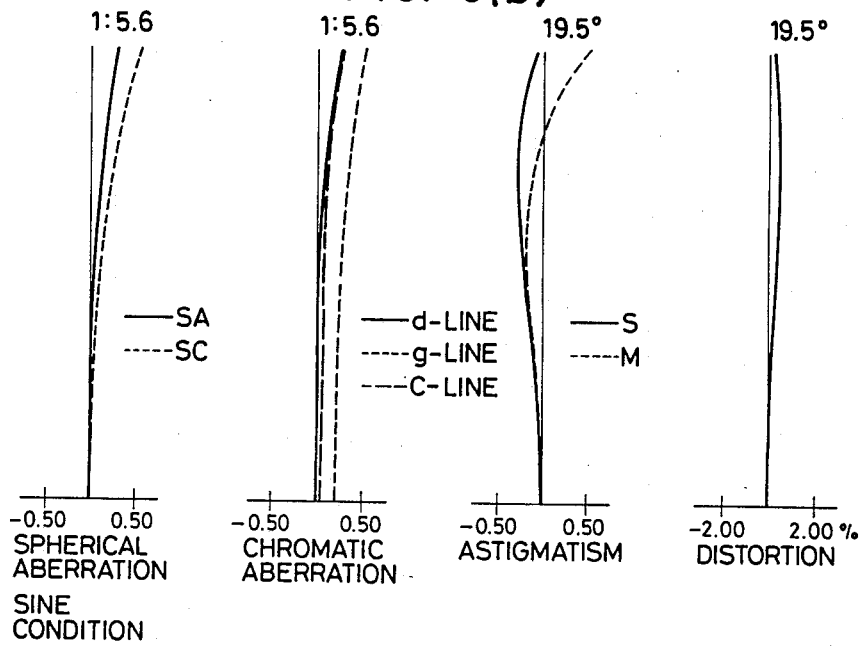

Basically, the zoom lens system for use in a compact camera of the present invention comprises, in order from the object side, a first lens component having a positive focal length, a second lens component having a positive focal length and a third lens component having a negative focal length, and satisfies the following conditions (A), (B) and (C):

(A) When zooming is made from the wide-angle end to the narrow-angle end, all of the first, second and third lens components are displaced toward the object side, with the distance between the first and second lens components being increased while the distance between the second and third lens components is decreased;

(B) The second lens component includes a diaphragm stop and is composed of the first unit 2a that is positioned close to the object than the diaphragm stop and which has a negative focal length, and the second unit 2b that is positioned closer to the image than the diaphragm stop and which has a positive focal length, the units 2a and 2b being adapted to be displaced ensemble; and (C)
(1) $0.5 < f_S/f_1 < 0.9$
(2) $0.9 < f_S/f_2 < 1.4$
(3) $0.0 < X_2/X_1 < 0.7$
(4) $-1.4 < f_S/f_2 < -0.7$
(5) $1.4 < f_S/f_2 < 2.0$ where $f_S$ is the focal length of the overall system at the wide-angle end;

$f_1$ is the focal length of the first lens component;

$f_2$ is the focal length of the second component;

$X_1$ is the amount of displacement of the first lens component toward the narrow-angle end as compared with the amount of displacement toward the wide-angle end;

$X_2$ is the amount of displacement of the second lens component toward the narrow-angle end as compared with the amount of displacement toward the wide-angle end;

$f_{2a}$ is the focal length of lens unit $2a$; and $f_{2b}$ is the focal length of lens unit $2b$.

In a preferred embodiment of the present invention, the first lens component is composed, if in order from the object side, a negative meniscus lens element and a positive meniscus lens element each having a convex surface directed toward the object side.

In another preferred embodiment, the second lens component is composed of a negative lens unit $2a$ that is positioned closer to the object than a diaphragm stop and which has a negative-positive or negative-positive-positive arrangement, and a positive lens unit $2b$ that is positioned closer to the image than the diaphragm stop and which has a positive-negative-positive arrangement. This second component also satisfies the following condition:

(6) $1.67 < N_{2an}$ where $N_{2an}$ is the refractive index at the d-line of the negative lens element in the second unit $2a$.

In still another embodiment, the third lens component is a unit solely composed of a single negative meniscus lens element having a concave surface directed toward the object side.

THE MECHANISM OF ACTION AND ADVANTAGES OF THE INVENTION

In a two-component type lens system, the amount of displacement of the second lens component, $\Delta X_2$, is expressed as $\Delta X_2 = f_2(m_{2L} - m_{2S})$, where $m_{2S}$ is the transverse magnification of the second lens component at the wide-angle end and $m_{2L}$ is the transverse magnification of the second lens component at the narrow-angle end. Since $m_{2L} < m_{2S} < 1.0$ in a telephoto type lens system, $\Delta X_2$ is inevitably increased to a significant value.

In order to solve this problem with the two-component type lens system, the present invention employs two positive lens components, i.e., the first and second components, and sufficiently increases the distance between these two lens components at the narrow-angle end to reduce the amounts of displacement of the individual lens components.

According to the present invention, a diaphragm stop is included in the second lens component and this has the advantage of simplifying the mechanism in association with the diaphragm stop because the second lens component needs to be displaced by the smallest amount of the three lens components and because it is not displaced during focusing.

Conditions (1) and (2) relate to the distribution of power between the first and second lens components. If the upper limit of condition (1) is exceeded, a condition results that is favorable for the purpose of producing a compact lens system, but at the same time, undesirably large changes will occur in spherical and coma aberrations during zooming. If the lower limit of condition (1) is not reached, the power of the first lens component is reduced and it has to be advanced by an increased amount to achieve proper focusing. In addition, the diameter of the front component is increased. If the upper limit of condition (2) is exceeded, a condition results that is favorable for the purpose of realizing a compact lens system, but at the same time, undesirably large changes will occur in coma and astigmatism during zooming. If the lower limit of condition (2) is not reached, the focal length of the overall system will change by only a small amount in response to a change in the distance between the second and third lens components and this results in the undesired increase in the amount of displacement of the large-diameter third lens component.

Condition (3) relates to the amounts of displacement of the first and second lens components. If the upper limit of this condition is exceeded, the change in the distance between the two lens components is reduced and the overall system is more like a two-component type than a three-component type, requiring the large-diameter third lens component to be displaced by an increased amount. If the lower limit of condition (3) is not reached, the change in the distance between the first and second lens groups is increased, which is favorable for the purpose of reducing the amount of displacement of each lens component. However, great variations will occur in spherical and coma aberrations during zooming.

Conditions (4) and (5) relate to the distribution of power between lenses in the second component. In the prior art three-component type lens system, the first of the two positive lens components is used as a master lens. This is in sharp contrast with the system of the present invention, in which the second of the two positive lens components serves as a master lens and is composed of a first unit $2a$ having a large negative power and a second unit $2b$ having a large positive power.

If the lower limit of condition (4) is not reached, the negative power of the first unit $2a$ is reduced and the balance between units $2a$ and $2b$ having opposite powers is upset to introduce great difficulty in compensation for coma. If the upper limit of condition (4) is exceeded, the powers of both units $2a$ and $2b$ are so much increased that the distance between these units is divided into two separate sections with the diaphragm stop being interposed even if they are not moved at all. This can cause a serious deterioration of system performance in case of mechanical errors.

As with condition (4), if the lower limit of condition (5) is not reached, the positive power of the second unit $2b$ is reduced and the balance between the two units $2a$ and $2b$ is upset to make cometic compensation difficult. If the upper limit of condition (5) is exceeded, the powers of two units $2a$ and $2b$ become undesirably large.

In addition to these conditions (1) to (5), condition (6) is preferably satisfied by the lens system of the present invention. If this condition is not met, it becomes difficult to compensate for a curvature of field and, in particular, the astigmatism in the sagittal direction at a maximum view angle (i.e., the wide-angle end) is likely to be overcompensated.

In another preferred embodiment, the first lens component is composed of a negative meniscus lens element and a positive meniscus lens element each having a convex surface directed toward the object side. This is effective not only for reducing the possible variations in aberrations that might occur as a result of the change in the distance to the object but also for compensation for distortion.

In still another preferred embodiment, the third lens component is a unit solely composed of a single negative lens element having a concave surface directed toward the object side. This is effective in compensating for a curvature of field and distortion.

Examples 1, 2 and 3 of the present invention are described in the following data, in which f signifies the focal length, $f_B$=back focus, $\omega$=half view angle, r=the radius of curvature of an individual lens surface, d=lens thickness or the aerial distance between lens surfaces, N=the refractive index at the d-line of an individual lens element, and $\nu$=the Abbe number of an individual lens element.

| Example 1 | | | | |
|---|---|---|---|---|
| 1:4.1~5.6 | | f = 39~61 | | |
| $\omega$ = 28.6°~19.4° | | $f_B$ = 8.3~23.3 | | |
| Surface No. | r | d | N | $\nu$ |
| 1 | 22.307 | 1.700 | 1.80518 | 25.4 |
| 2 | 15.000 | 0.000 | | |
| 3 | 15.000 | 8.834 | 1.77250 | 49.6 |
| 4 | 40.690 | 2.500~10.428 | | |
| 5 | −31.543 | 1.000 | 1.83400 | 37.2 |
| 6 | 16.189 | 0.000 | | |
| 7 | 16.189 | 1.878 | 1.68893 | 31.1 |
| 8 | −105.981 | 3.239 | | |
| 9 | 190.317 | 1.600 | 1.69350 | 53.2 |
| 10 | −19.108 | 0.606 | | |
| 11 | −10.810 | 1.000 | 1.80518 | 25.4 |
| 12 | −25.074 | 0.378 | | |
| 13 | −179.891 | 2.084 | 1.74950 | 35.3 |
| 14 | −14.573 | 16.182~6.682 | | |
| 15 | −17.188 | 1.700 | 1.69680 | 55.5 |
| 16 | −75.680 | | | |

| Example 2 | | | | |
|---|---|---|---|---|
| 1:4.1~5.6 | | f = 39~63 | | |
| $\omega$ = 28.4°~18.9° | | $f_B$ = 8.0~24.05 | | |
| Surface No. | r | d | N | $\nu$ |
| 1 | 21.871 | 1.700 | 1.80518 | 25.4 |
| 2 | 15.128 | 0.000 | | |
| 3 | 15.128 | 7.153 | 1.77250 | 49.6 |
| 4 | 37.106 | 2.500~11.124 | | |
| 5 | −30.522 | 1.000 | 1.83400 | 37.2 |
| 6 | 13.594 | 0.000 | | |
| 7 | 13.594 | 1.899 | 1.80518 | 25.4 |
| 8 | 26.194 | 0.100 | | |
| 9 | 22.915 | 1.840 | 1.69680 | 55.5 |
| 10 | −93.592 | 3.450 | | |
| 11 | 57.698 | 1.615 | 1.69680 | 55.5 |
| 12 | −24.119 | 1.269 | | |
| 13 | −11.799 | 1.000 | 1.80518 | 25.4 |
| 14 | −22.851 | 0.299 | | |
| 15 | −51.164 | 1.703 | 1.71736 | 29.5 |
| 16 | −15.252 | 15.773~6.279 | | |
| 17 | −16.633 | 1.700 | 1.69680 | 55.5 |
| 18 | −78.091 | | | |

| Example 3 | | | | |
|---|---|---|---|---|
| 1:4.1~5.6 | | f = 39~61 | | |
| $\omega$ = 28.6°~19.5° | | $f_B$ = 8.3~23.3 | | |
| Surface No. | r | d | N | $\nu$ |
| 1 | 21.524 | 1.700 | 1.84666 | 23.9 |
| 2 | 15.000 | 0.000 | | |
| 3 | 15.000 | 8.113 | 1.77250 | 49.6 |
| 4 | 39.629 | 2.531~10.481 | | |
| 5 | −32.095 | 1.000 | 1.83400 | 37.2 |
| 6 | 13.290 | 0.000 | | |
| 7 | 13.290 | 2.025 | 1.68893 | 31.1 |
| 8 | −87.745 | 3.403 | | |
| 9 | 160.437 | 1.617 | 1.69350 | 53.2 |
| 10 | −19.304 | 0.620 | | |

| -continued | | | | |
|---|---|---|---|---|
| Example 3 | | | | |
| 1:4.1~5.6 | | f = 39~61 | | |
| $\omega$ = 28.6°~19.5° | | $f_B$ = 8.3~23.3 | | |
| Surface No. | r | d | N | $\nu$ |
| 11 | −10.585 | 1.000 | 1.80518 | 25.4 |
| 12 | −25.845 | 0.236 | | |
| 13 | −130.709 | 2.092 | 1.74950 | 35.3 |
| 14 | −13.742 | 16.662~7.168 | | |
| 15 | −17.099 | 1.700 | 1.69680 | 55.5 |
| 16 | −74.413 | | | |

As shown below, the lens systems constructed in Examples 1 to 3 satisfy all of the conditions (1) to (5).

| Condition | Example 1 | Example 2 | Example 3 |
|---|---|---|---|
| (1) $f_S/f_1$ | 0.736 | 0.684 | 0.736 |
| (2) $f_S/f_2$ | 1.143 | 1.146 | 1.14 |
| (3) $X_2/X_1$ | 0.41 | 0.43 | 0.41 |
| (4) $f_S/f_{2a}$ | −1.118 | −0.841 | −1.121 |
| (5) $f_S/f_{2b}$ | 1.807 | 1.621 | 1.793 |

I claim:

1. A zoom lens system for use in a compact camera which comprises, in order from the object side, a first lens component having a positive focal length, a second lens component having a positive focal length and a third lens component having a negative focal length, and which satisfies the following conditions (A), (B), and (C):

(A) when zooming is made from the wide-angle end to the narrow-angle end, all of the first, second and third lens components are displaced toward the object side, with the distance between the first and second lens components being increased while the distance between the second and third lens components is decreased;

(B) the second lens component includes a diaphragm stop and is composed of a first unit that is positioned closer to the object than the diaphragm stop and which has a negative focal length, and a second unit that is positioned closer to the image than the diaphragm stop and which has a positive focal length, the first and second units being adapted to be displaced ensemble; and (C)
(1) $0.5 < f_S/f_1 < 0.9$
(2) $0.9 < f_S/f_2 < 1.4$
(3) $0.0 < X_2/X_1 < 0.7$
(4) $-1.4 < f_S/f_{2a} < -0.7$
(5) $1.4 < f_S/f_{2b} < 2.0$ where
$f_S$ is the focal length of the overall system at the wide-angle end;
$f_1$ is the focal length of the first lens component;
$f_2$ is the focal length of the second component;
$X_1$ is the amount of displacement of the first lens component toward the narrow-angle end as compared with the amount of displacement toward the wide-angle end;
$X_2$ is the amount of displacement of the second lens component toward the narrow-angle end as compared with the amount of displacement toward the wide-angle end;
$f_{2a}$ is the focal length of the first unit; and
$f_{2b}$ is the focal length of the second unit.

2. A zoom lens system according to claim 1 wherein the first lens component is composed, in order from the object side, a negative meniscus lens element and a positive meniscus lens element each having a convex surface directed toward the object side.

3. A zoom lens system according to claim 1 wherein the first unit is a negative lens unit that is positioned closer to the object than a diaphragm stop and which has a negative-positive or negative-positive-positive arrangement, and said second unit that is positioned closer to the image than the diaphragm stop and has a positive-negative-positive arrangement, said second component also satisfying the following condition:

(6) $1.67 < N_{2an}$ where $N_{2an}$ is the refractive index at the d-line of the negative lens element in the second unit.

4. A zoom lens system according to claim 1 wherein the third lens component is a unit solely composed of a single negative meniscus lens element having a concave surface directed toward the object side.

5. A zoom lens system for use in a compact camera which comprises, in order from the object side, a first lens component having a positive focal length, a second lens component having a positive focal length and a third lens component having a negative focal length, and which satisfies the following conditions (A), (B), and (C):

(A) when zooming is made from the wide-angle end to the narrow-angle end, all of the first, second and third lens components are displaced toward the object side, with the distance between the first and second lens components being increased while the distance between the second and third lens components is decreased;

(B) the second lens component includes a diaphragm stop and is composed of a first unit which has a negative focal length, and a second unit which has a positive focal length, the first and second units being adapted to be displaced ensemble; and (C)
(1) $0.5 < f_S/f_1 < 0.9$
(2) $0.9 < f_S/f_2 < 1.4$
(4) $-1.4 < f_S/f_{2a} < -0.7$
(5) $1.4 < f_S/f_{2b} < 2.0$ where
$f_S$ is the focal length of the overall system at the wide-angle end;
$f_1$ is the focal length of the first lens component;
$f_2$ is the focal length of the second component;
$f_{2a}$ is the focal length of the first unit; and
$f_{2b}$ is the focal length of the second unit.

6. A zoom lens system according to claim 5 wherein the first component is composed, in order from the object side, of a negative meniscus lens element and a positive meniscus lens element each having a convex surface directed toward the object side.

7. A zoom lens system according to claim 5 wherein the first unit is a negative lens unit that is positioned closer to the object than a diaphragm stop and which has a negative-positive or negative-positive-positive arrangement, and said second unit is positioned closer to the image than the diaphragm stop and has a positive-negative-positive arrangement, said second component also satisfying the following condition:

(6) $1.67 < N_{2an}$ where $N_{2an}$ is the refractive index at the d-line of the negative lens element in the second unit.

8. A zoom lens system according to claim 5 wherein the third lens component is a unit solely composed of a single negative meniscus lens element having a concave surface directed toward the object side.

9. A zoom lens system according to claim 5 wherein said condition (C) includes the following:

(3) $0.0 < X_2/X_1 < 0.7$ where
$X_1$ is the amount of displacement of the first lens component toward the narrow-angle end as compared with the amount of displacement toward the wide-angle end; and
$X_2$ is the amount of displacement of the second lens component toward the narrow-angle end as compared with the amount of displacement toward the wide-angle end.

10. A zoom lens system for use in a compact camera which comprises, in order from the object side, a first lens component having a positive focal length, a second lens component having a positive focal length and a third lens component having a negative focal length, and which satisfies the following conditions (A) and (B):

(A) when zooming is made from the wide-angle end to the narrow-angle end, all of the first, second and third lens components are displaced toward the object side, with the distance between the first and second lens components being increased while the distance between the second and third lens components is decreased; and (B) the second lens component includes a diaphragm stop and is composed of a first unit which has a negative focal length, and a second unit which has a positive focal length, the first and second units being adapted to be displaced ensemble;

wherein the first component is composed, in order from the object side, of a negative meniscus lens element and a positive meniscus lens element each having a convex surface directed toward the object side.

11. A zoom lens system according to claim 10 wherein the first unit is a negative lens unit that is positioned closer to the object than a diaphragm stop and which has a negative-positive or negative-positive-positive arrangement, and said second unit is positioned closer to the image than the diaphragm stop and has a positive-negative-positive arrangement, said second component also satisfying the following condition:

(6) $1.67 < N_{2an}$ where $N_{2an}$ is the refractive index at the d-line of the negative lens element in the second unit.

12. A zoom lens system according to claim 10 wherein said first unit is positioned closer to the object than the diaphragm stop and said second unit is positioned closer to the image than the diaphragm stop.

13. A zoom lens system for use in a compact camera which comprises, in order from the object side, a first lens component having a positive focal length, a second lens component having a positive focal length and a third lens component having a negative focal length, and which satisfies the following conditions (A) and (B):

(A) when zooming is made from the wide-angle end to the narrow-angle end, all of the first, second and third lens components are displaced toward the object side, with the distance between the first and second lens components being increased while the distance between the second and third lens components is decreased; and (B) the second lens component includes a diaphragm stop and is composed of a first unit which has a negative focal length, and a second unit which has a positive focal length, the first and second units being adapted to be displaced ensemble;

wherein the third lens group is a unit solely composed of a single negative meniscus lens element having a concave surface directed toward the object side.

14. A zoom lens system according to claim 13 wherein the first unit is a negative lens unit that is positioned closer to the object than a diaphragm stop and which has a negative-positive or negative-positive-positive arrangement, and said second unit is positioned closer to the image than the diaphragm stop and has a positive-negative-positive arrangement, said second component also satisfying the following condition:

(6) $1.67 < N_{2an}$ where $N_{2an}$ is the refractive index at the d-line of the negative lens element in the second unit.

15. A zoom lens system according to claim 13 wherein said first unit is positioned closer to the object than the diaphragm stop and said second unit is positioned closer to the image than the diaphragm stop.

* * * * *